United States Patent
Stiller et al.

(10) Patent No.: US 7,912,603 B2
(45) Date of Patent: Mar. 22, 2011

(54) METHOD FOR CONTROLLING THE DAMPER FORCE IN VEHICLES HAVING A RIDE LEVEL CONTROL SYSTEM

(75) Inventors: Alexander Stiller, Garbsen (DE); Andreas Rieckmann, Hannover (DE); Uwe Folchert, Lauenau (DE)

(73) Assignee: Continental Teves AG & Co., OHG, Frankfurt (DE)

(*) Notice: Subject to any disclaimer, the term of this patent is extended or adjusted under 35 U.S.C. 154(b) by 526 days.

(21) Appl. No.: 10/593,854

(22) PCT Filed: Jan. 17, 2005

(86) PCT No.: PCT/EP2005/050161
§ 371 (c)(1),
(2), (4) Date: Sep. 22, 2006

(87) PCT Pub. No.: WO2005/095131
PCT Pub. Date: Oct. 13, 2005

(65) Prior Publication Data
US 2007/0150143 A1 Jun. 28, 2007

(30) Foreign Application Priority Data
Mar. 22, 2004 (DE) .......................... 10 2004 014 329

(51) Int. Cl.
*G06F 17/00* (2006.01)
*B62D 24/04* (2006.01)
(52) U.S. Cl. ............................................ 701/37; 280/5.5
(58) Field of Classification Search ............... 701/36–38, 701/41; 280/5.5, 5.512, 5.514, 5.515
See application file for complete search history.

(56) References Cited

U.S. PATENT DOCUMENTS

| | | | | | |
|---|---|---|---|---|---|
| 4,634,142 | A | * | 1/1987 | Woods et al. | 280/5.503 |
| 5,369,582 | A | * | 11/1994 | Gorny et al. | 701/37 |
| 5,743,553 | A | | 4/1998 | Nagel et al. | |
| 5,987,369 | A | * | 11/1999 | Kwak et al. | 701/37 |
| 6,237,504 | B1 | * | 5/2001 | Tanahashi et al. | 104/243 |
| 6,259,982 | B1 | | 7/2001 | Williams et al. | |
| 2002/0161498 | A1 | | 10/2002 | Stiller et al. | |
| 2002/0166741 | A1 | | 11/2002 | Kock et al. | |
| 2004/0128040 | A1 | | 7/2004 | Stiller et al. | |

* cited by examiner

*Primary Examiner* — Yonel Beaulieu

(57) ABSTRACT

The damper force in vehicles having a ride level control system is controlled by, when the leveling system is activated, a signal that is generated and transmitted to a damper force control device (5). When the level control system is activated, the damper force is adapted, and especially reduced for a rapid control.

6 Claims, 1 Drawing Sheet

METHOD FOR CONTROLLING THE DAMPER FORCE IN VEHICLES HAVING A RIDE LEVEL CONTROL SYSTEM

This application is the U.S. national phase of international application PCT/EP05/50161 filed Jan. 17, 2005, which designated the U.S. and which claims the benefit of priority of German Patent Application Number 10 2004 014 329.3 filed Mar. 22, 2004. The contents of each of the aforementioned documents are incorporated herein in their entirety.

BACKGROUND OF THE INVENTION

The invention relates to a method for controlling the damper force in vehicles having a ride level control system. This method is to be used in particular in vehicles having a pneumatic, hydraulic or hydro-pneumatic ride level control system.

Both in passenger cars and trucks it is possible to change the ride level of the vehicle body or the loading surface, for example by means of hydraulic, pneumatic or hydro-pneumatic adjustment devices. In particular in vehicles with air suspension it is thus possible to perform adaptation to loading as a result of addition of a cargo or adaptation to the terrain to be traveled over. In off-road vehicles, a higher ground clearance is set in the off-road mode, while in the road mode the center of gravity is moved downward in order to ensure a better position on the road.

In addition, with active or semi-active chassis it is possible to control the damper force in order to adapt the damping of the chassis to the driving situations.

The object of the present invention is to make available a method for controlling the damper force in vehicles having a ride level control system, which method permits a high adjustment speed and precise adaptation to the desired ride level.

SUMMARY OF THE INVENTION

This object is achieved according to the invention in that when the ride level control system is activated a signal is generated and transmitted to a damper force control device, for example an electrically activated valve which is arranged on the damper, said damper force control device being used to change the damper force while the ride level control system is activated.

When the ride level of the vehicle body changes, the damper control usually operates counter to the ride level control system since the damper control system receives the signal indicating that a change is occurring in the distance between the wheel axle and the vehicle body. In order to compensate for this change, increased damping is made available since the damper control system does not see whether the change in ride level is desired or takes place owing to vehicle movement dynamic effects.

For the method according to the invention, the damper force is changed while the ride level control system is activated, in order to bring about the fastest and most precise adjustment possible of the ride level of the body to the desired target value.

One development of the invention provides for the damper force to be adapted in such a way that the damper force is reduced in order to bring about the fastest and most unimpeded adjustment possible of the ride level of the body. After the target value is reached or when a predefined switch-off value is reached, the damper force is adjusted back again to the preset value.

In order to avoid overshooting when the ride level is adjusted, there is also provision for the damper force to be increased briefly above the value set prior to effecting control of the ride level, in order to avoid overshooting when the ride level of the vehicle body is changed. This is appropriate in particular with enclosed air supply systems since a very high adjustment speed of the vehicle body can be achieved by means of such enclosed air supply systems. The overshooting of the target control position is prevented by virtue of the fact that the damper force is briefly increased. This is possible since the adjustment of the damper takes place significantly more quickly than the adjustment of the ride level of the vehicle body.

One development of the invention provides for the signal which is transmitted to the damper force control device to include information about the control speed, that is to say the speed at which the vehicle body can be lowered or raised. The damper force is then reduced or increased as a function of the control speed in order to be able to set the aimed-at ride level of the vehicle body as precisely as possible. The faster the vehicle body is raised, the greater the tendency of the system to overshoot so that a correspondingly higher damper force has to be set.

Furthermore there is provision for the damper force to be reduced only at control speeds which lie in a range defined by limiting values. This range is the speed range in which the ride level control takes place when it is initiated by a user. If the limiting values are exceeded, for example as a result of braking maneuvers or situations which are relevant in terms of vehicle movement dynamics, the damper force is increased or an intervention into the normal damper force control system is switched off.

One development of the invention provides for the control speed to be determined in advance, in particular when a journey is started, and for a parameter for the adaptation of the damper force to be determined by reference to the control speed which is determined. The control speed depends, inter alia, on the load on the vehicle, and when the load is large the vehicle body is raised more slowly than when the load is small. The damper force is then determined in accordance with the control speed once it has been defined for the ride level control system, or a parameter with which the damper force is adapted while the ride level control system is activated is defined. If the damper force is firstly reduced in order to facilitate adjustment and is then increased in order to avoid overshooting, a plurality of parameters can be defined.

Likewise there is provision for the damper force to be adapted as a function of parameters which permit conclusions to be drawn about the vehicle movement dynamic states, in particular the steering movement, the steering angle, the brake pressure or acceleration forces, in particular lateral acceleration forces or longitudinal acceleration forces. These parameters are determined in the driving mode and give indications of the vehicle movement dynamic state which the vehicle is in. When the ride level control system is activated and the brake pressure is high, the reduction in the damper force is switched off in this way since by detecting a predefined brake pressure a braking maneuver is determined, which results in an increase in the damper force for reasons of driving safety equipment. Correspondingly, the reduction in the damper force owing to an activated ride level control system is cancelled. The same applies to corresponding steering movements which indicate a lane change, or to the steering angle which permits conclusions to be drawn about lateral accelerations.

The claimed method and the development make it possible to precisely set a ride level set point value even at high control speeds and when there is a large degree of damping so that the damper control does not impede a ride level control process. Furthermore, a fast ride level control speed can be achieved since hardening of the damper does not have a disadvantageous effect on the adjustment.

In particular valves which can be switched electrically and with which damper forces can be varied over a wide range in a very short time are provided as damper force control devices. The damper force is thus controlled as a function of whether a ride level control system is provided and of the stage which the ride level control system is in. However, damper interventions which are critical in terms of vehicle movement dynamics, for example when cornering or during braking maneuvers, remain unaffected.

If the damper control is normally carried out by means of a skyhook algorithm, this skyhook algorithm is deactivated when the ride level control system is activated and the damper is set to a soft setting. In the skyhook algorithm the damper speed is reduced by the size of the control speed so that interventions do not occur, or no longer occur so violently, when there are movements of the vehicle body. In critical driving situations, the skyhook algorithm is activated despite the ride level control system being activated. control system is cancelled. The same applies to corresponding steering movements which indicate a lane change, or to the steering angle which permits conclusions to be drawn about lateral accelerations.

The claimed method and the development make it possible to precisely set a ride level set point value even at high control speeds and when there is a large degree of damping so that the damper control does not impede a ride level control process. Furthermore, a fast ride level control speed can be achieved since hardening of the damper does not have a disadvantageous effect on the adjustment.

In particular valves which can be switched electrically and with which damper forces can be varied over a wide range in a very short time are provided as damper force control devices. The damper force is thus controlled as a function of whether a ride level control system is provided and of the stage which the ride level control system is in. However, damper interventions which are critical in terms of vehicle movement dynamics, for example when cornering or during braking maneuvers, remain unaffected.

If the damper control is normally carried out by means of a skyhook algorithm, this skyhook algorithm is deactivated when the ride level control system is activated and the damper is set to a soft setting. In the skyhook algorithm the damper speed is reduced by the size of the control speed so that interventions do not occur, or no longer occur so violently, when there are movements of the vehicle body. In critical driving situations, the skyhook algorithm is activated despite the ride level control system being activated.

DETAILED DESCRIPTION OF THE DRAWING

Figure 1:
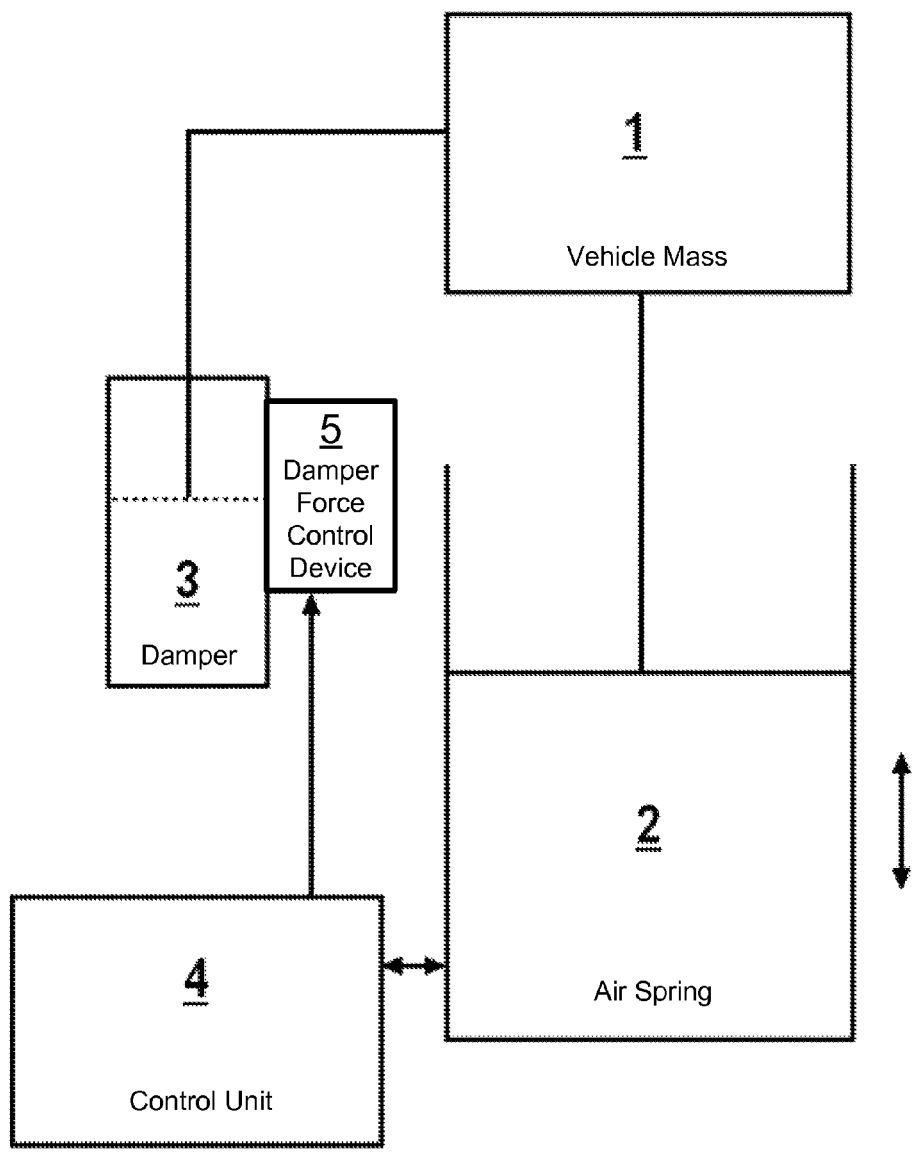
FIG. 1 shows a schematic illustration of a spring mass system according to the invention.

The single FIGURE shows a schematic illustration of a spring mass system in which the mass 1 represents the vehicle body which is supported with respect to the wheel by means of an airspring 2. The spring mass system 1, 2 is assigned a damper 3 by means of which different degrees of damping can be set. When the ride level control system is activated, which is performed, for example, by means of a control unit 4 by letting out compressed air from the airspring 2 or by applying an increased air pressure to the airspring 2, a signal is simultaneously transmitted to the damper 3 so that the damper force can be adapted when the ride level control system is activated. The signal or the information is transmitted in this context to a damper force control device 5 which is embodied as an electrically actuated valve with which the damper force can be very quickly adapted to the desired damper force level.

The invention claimed is:

1. A method for controlling the damper force in vehicles having a ride level control system, comprising the steps of
    initiating a signal when the ride level control system is changing a vehicle ride level;
    transmitting the signal to a damper force control device;
    adapting the damper force based on the signal while the ride level control system is changing the vehicle ride level; and
    terminating the signal when the ride level control system finishes changing the vehicle ride level.

2. The method according to claim 1, wherein the damper force is reduced or increased.

3. The method according to claim 2, wherein the damper force is reduced only at control speeds which lie in a range defined by limiting values, and wherein the damper force is increased when the limiting values are exceeded.

4. The method according to claim 1, wherein the signal contains information about a control speed, and the damper force is adapted as a function of the control speed.

5. The method according to claim 4, comprising the steps of
    determining the control speed in advance and
    determining a parameter for the adaptation of the damper force by reference to the control speed.

6. The method according to claim 1, wherein the damper force is adapted as a function of at least one member of the group consisting of the following quantities: steering movement, steering angle, brake pressure, acceleration forces.

* * * * *